United States Patent
Smith et al.

(10) Patent No.: US 10,968,616 B1
(45) Date of Patent: Apr. 6, 2021

(54) WATER DRAINAGE SYSTEM

(71) Applicant: Subsurface Systems, LLC, Southaven, MS (US)

(72) Inventors: Ben Smith, Southaven, MS (US); Lance Smith, Southaven, MS (US); Robert A. Saldeen, Southaven, MS (US)

( * ) Notice: Subject to any disclaimer, the term of this patent is extended or adjusted under 35 U.S.C. 154(b) by 0 days.

(21) Appl. No.: 16/870,820

(22) Filed: May 8, 2020

Related U.S. Application Data (60) Provisional application No. 62/845,073, filed on May 8, 2019.

(51) Int. Cl.
| | | |
|---|---|---|
| *E03F 5/04* | (2006.01) | |
| *C02F 1/00* | (2006.01) | |
| *B01D 24/10* | (2006.01) | |
| *E03F 1/00* | (2006.01) | |
| *E02B 11/00* | (2006.01) | |
| *C02F 103/00* | (2006.01) | |

(52) U.S. Cl.
CPC ............ *E03F 5/0404* (2013.01); *B01D 24/10* (2013.01); *C02F 1/004* (2013.01); *E02B 11/00* (2013.01); *E03F 1/00* (2013.01); *C02F 2103/001* (2013.01)

(58) Field of Classification Search
CPC ..... E03F 1/00; E03F 1/002; E03F 5/02; E03F 5/0401; E03F 5/0404; E02B 11/00; C02F 2103/001
USPC .... 210/163, 164, 165, 170.03, 747.3; 404/2, 404/4; 405/36
See application file for complete search history.

(56) References Cited

U.S. PATENT DOCUMENTS

| | | | | | |
|---|---|---|---|---|---|
| 4,793,728 | A | * | 12/1988 | Ellis ........................ | E02B 11/00 404/2 |
| 4,919,568 | A | * | 4/1990 | Hurley .................... | E02B 11/00 405/36 |
| 6,309,139 | B1 | * | 10/2001 | Tran-Quoc-Nam ...... | E03F 5/02 404/2 |
| 7,108,783 | B2 | * | 9/2006 | Glazik ..................... | E03F 1/00 210/163 |

(Continued)

FOREIGN PATENT DOCUMENTS

| | | |
|---|---|---|
| AU | 2008201960 A | 11/2009 |
| CN | 105401641 A | 3/2016 |

(Continued)

*Primary Examiner* — Christopher Upton
(74) *Attorney, Agent, or Firm* — C. Brandon Browning; Maynard, Cooper & Gale, PC (57) ABSTRACT

A drainage system for removing groundwater from underneath a water impervious surface including a first housing located below grade having a continuous sidewall, a floor, an open top extending to or through the surface through which stormwater collecting on the surface may enter into the housing, an outlet extending through the sidewall immediately adjacent to the floor and an inlet through the sidewall. A locking ring is fixed within the inlet, and a drain wick is coupled to the locking ring, the drain wick being configured for collecting groundwater underneath the surface and directing the groundwater through the inlet and into the housing. The drain wick includes a pipe having and plurality of radial openings, a perforated first end cap, a second end including screen and a locking nut configured for coupling to the locking ring and a filter bag located between the screen and end cap.

6 Claims, 10 Drawing Sheets

(56) References Cited

U.S. PATENT DOCUMENTS

| | | | |
|---|---|---|---|
| 7,497,234 B2* | 3/2009 | Robinson | E03F 1/00 |
| | | | 210/170.03 |
| 7,540,953 B2* | 6/2009 | Fitzgerald | E03F 5/0404 |
| | | | 210/165 |
| 8,012,346 B2 | 9/2011 | Peters, Jr. et al. | |
| 8,834,060 B2 | 9/2014 | Lawry | |
| 8,911,626 B2 | 12/2014 | Allard | |
| 9,322,156 B2 | 4/2016 | McInnis et al. | |
| 10,174,494 B2 | 1/2019 | Fink et al. | |
| 2011/0049028 A1* | 3/2011 | Olson | E03F 1/002 |
| | | | 210/170.03 |
| 2013/0180903 A1 | 7/2013 | Kowalsky | |
| 2015/0041379 A1 | 2/2015 | Kent | |

FOREIGN PATENT DOCUMENTS

| | | | |
|---|---|---|---|
| CN | 2015189108 U | | 4/2016 |
| EP | 3674493 | * | 7/2020 |
| KR | 20150090577 A | | 8/2015 |

* cited by examiner

WATER DRAINAGE SYSTEM

RELATED APPLICATION

This application claims priority to U.S. Provisional Patent Application No. 62/845,073 filed on May 8, 2019, titled "Water Drainage System", the entire contents of which are incorporated herein by reference.

FIELD OF USE

The present invention is directed to a water drainage system and, more particularly, to a groundwater drainage system configured for removal of groundwater from underneath roads, buildings, parking lots and the like.

BACKGROUND OF THE INVENTION

Stormwater is water that originates during precipitation events and snow/ice melt. Stormwater can soak into the soil (infiltrate), be held on the surface and evaporate, or runoff and end up in nearby streams, rivers, or other water bodies (surface water). Groundwater is the water present beneath Earth's surface in soil pore spaces and in the fractures of rock formations.

Drainage is the natural or artificial removal of a surface's water and sub-surface water from an area with excess of water.

A stormwater drain is infrastructure designed to drain excess rain and ground water from impervious surfaces such as paved streets, car parks, parking lots, footpaths, sidewalks, and roofs. Storm drains vary in design from small residential dry wells to large municipal systems. Drains receive water from street gutters on most motorways, freeways and other busy roads, as well as towns in areas with heavy rainfall that leads to flooding, and coastal towns with regular storms. Many storm drainage systems are gravity sewers that drain untreated storm water into rivers or streams.

There are two main types of stormwater drain inlets: side inlets and grated inlets. Side inlets are located adjacent to the curb and rely on the ability of the opening under the back stone or lintel to capture flow. They are usually depressed at the invert of the channel to improve capture capacity. Grated inlets have gratings or grids to prevent people, vehicles, large objects or debris from falling into the storm drain. Grate bars are spaced so that the flow of water is not impeded, but sediment and many small objects can also fall through. Storm drains in streets and parking areas must be strong enough to support the weight of vehicles, and are often made of cast iron or reinforced concrete.

Most drains have a single large exit at their point of discharge (often covered by a grating) into a canal, river, lake, reservoir, sea or ocean. Other than catchbasins, typically there are no treatment facilities in the piping system. Small storm drains may discharge into individual dry wells. Storm drains may be interconnected using slotted pipe, to make a larger dry well system. Storm drains may discharge into man-made excavations known as recharge basins or retention ponds.

Pipes are used to carry water between drain inlets and exits. Pipe can come in many different cross-sectional shapes (rectangular, square, bread-loaf-shaped, oval, inverted pear-shaped, egg shaped, and most commonly, circular). Pipes made of different materials can also be used, such as brick, concrete, high-density polyethylene or galvanized steel. Fiber reinforced plastic is being used more commonly for drain pipes and fittings.

A catch basin or storm drain is a curbside drain with the sole function of collecting rainwater from properties and streets and transporting it to local waterways through a system of underground piping, culverts and/or drainage ditches. Storm drains can also be found in parking lots and serve the same purpose.

A manhole is the opening to a confined space such as a large vessel, a shaft or a utility vault (often used to house an access point for making connections, inspection, valve adjustments or performing maintenance on underground and buried public utility and other services including water, sewers, telephone, electricity, storm drains, district heating and gas). Manhole closings are protected by a grating or manhole cover, a flat plug designed to prevent accidental or unauthorized access to the manhole. Those plugs are traditionally made of metal, but may be constructed from precast concrete, or glass reinforced plastic. Manholes are usually outfitted with metal, polypropylene, or fiberglass steps installed in the inner side of the wall to allow easy descent into the utility space. The access openings are usually circular in shape to prevent accidental fall of the cover into the hole. Manholes are generally found in urban areas, in streets and occasionally under sidewalks.

The base course or basecourse in pavements is a layer of material in an asphalt roadway, race track, riding arena, or sporting field. It is located under the surface layer consisting of the wearing course and sometimes an extra binder course.

A spring line is an imaginary horizontal reference line located at mid-height, or halfway point, of a circular conduit, pipe, tunnel, or the point at which the side walls are vertical on a horseshoe-shaped conduit. Also the maximum horizontal dimension or diameter of a circular conduit, pipe, or tunnel.

SUMMARY OF INVENTION

The present invention is directed to a water drainage system configured for collecting and removing stormwater from a surface and groundwater from underneath the surface where the surface is parking lot, a road, a patio, a driveway, a sidewalk, a stone slab, a concrete slab, a water impervious slab, an asphalt slab or a base of a building. According to one aspect of the invention, the system includes a first housing located below grade having a continuous sidewall, a floor, a void defined by the floor and the continuous sidewall, an open top extending to or through the surface through which stormwater collecting on the surface may enter into the void, an outlet extending through the sidewall immediately adjacent to the floor, and a plurality of inlets through the sidewall located above the outlet. The housing may be a drain manhole, a catch basin side inlet or a catch basin grated inlet.

A locking ring is fixed within each inlet of the plurality of inlets. The locking rings allow drain wicks to be fluidly coupled to the inlets, the drain wicks being configured for collecting groundwater underneath the surface and directing the ground water through the inlets and into the void. Each drain wick includes a pipe having a spring line and plurality of radial openings extending there through at or below the spring line, a first end cap having a plurality of holes there through, an opposing second end including a locking nut configured for detachably coupling the second end of the drain wick to the locking ring, a wire screen in the second end, a filter cloth bag located between the wire screen and the first end cap, and a filter media in the cloth bag.

In one embodiment, the system includes a pipe fluidly coupled between the outlet of the first housing and a second housing. The second housing may be a second drain manhole, a second catch basin side inlet or a second catch basin grated inlet. The second housing may or may not include drain wick or other means for collecting groundwater.

According to a second aspect of the invention, there is provided a water drainage system including a first housing located below grade having a continuous sidewall, a floor, a void defined by the floor and the continuous sidewall, an open top extending to or through the surface through which stormwater collecting on the surface may enter into the void, an outlet extending through the sidewall immediately adjacent to the floor, and a plurality of inlets through the sidewall located above the outlet, wherein the housing is selected from the group consisting of a drain manhole, a catch basin side inlet, and a catch basin grated inlet. A drain grill assembly is removably fixed within each inlet and configured for allowing the ground water to pass through the inlet and into the void.

The drain grill assembly includes a substantially rectangular frame supporting a rectangular grill. An amount of gravel is disposed outside of the housing and immediately adjacent to each drain grill assembly, the amount of gravel being sufficient to completely cover the drain grill assembly. A filter cloth covers the entirety of the amount of gravel, except in some instances the cloth may not cover that portion of the gravel that contacts the housing and drain grill assembly.

DETAILED DESCRIPTION

Figure 14:
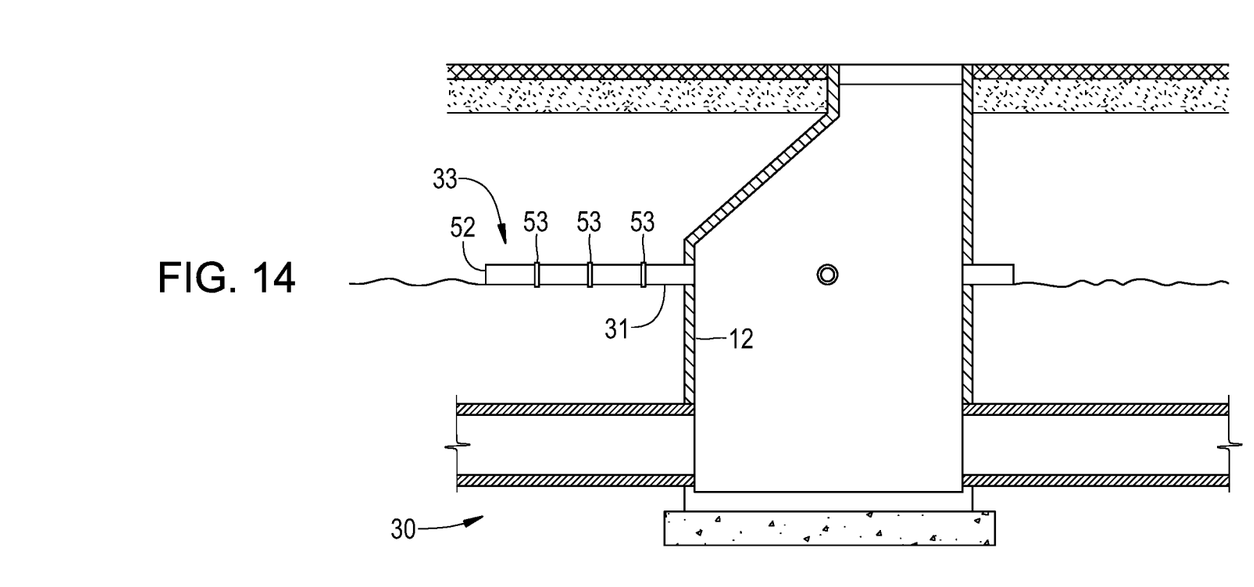
FIG. 14 is a sectional view of the drain manhole of FIG. 2 including an alternative drain wick design.
Figure 15:
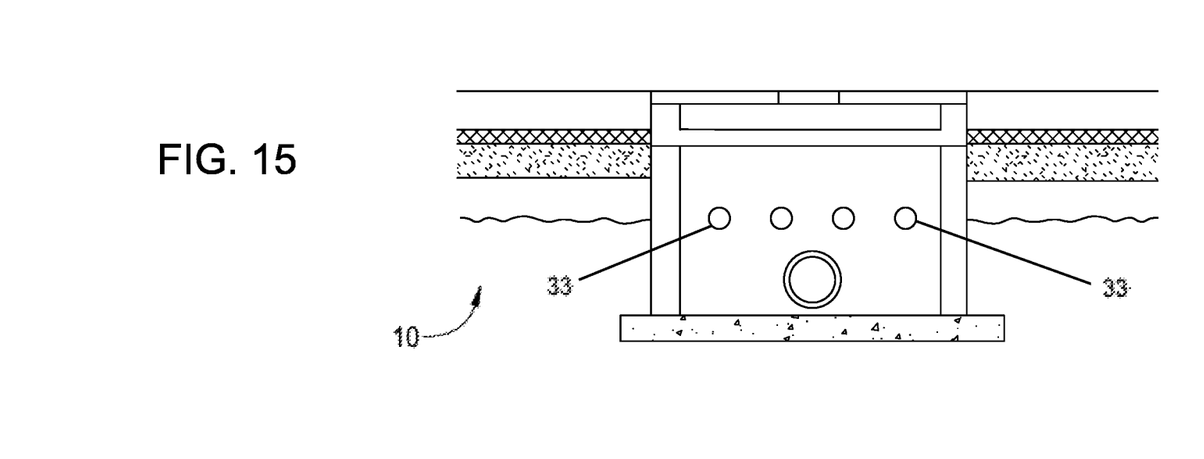
FIG. 15 is a sectional view of the catch basin of FIG. 1 including an alternative drain wick design.

The present invention is directed to drainage systems for collecting and removing groundwater from underneath roads, parking lots, buildings and the like. The systems may be used with catch basins for collecting both stormwater and groundwater, or drain manholes for collecting primarily groundwater. FIGS. 1 through 8 depict a first embodiment of a water drainage system in accordance with the present invention. FIGS. 9 through 13 depict a second embodiment of a water drainage system in accordance with the present invention. FIG. 14 depict a third embodiment of a water drainage system in accordance with the present invention. FIG. 15 is a schematic view of a parking lot water drainage system utilizing various components of the present invention.

Figure 1:
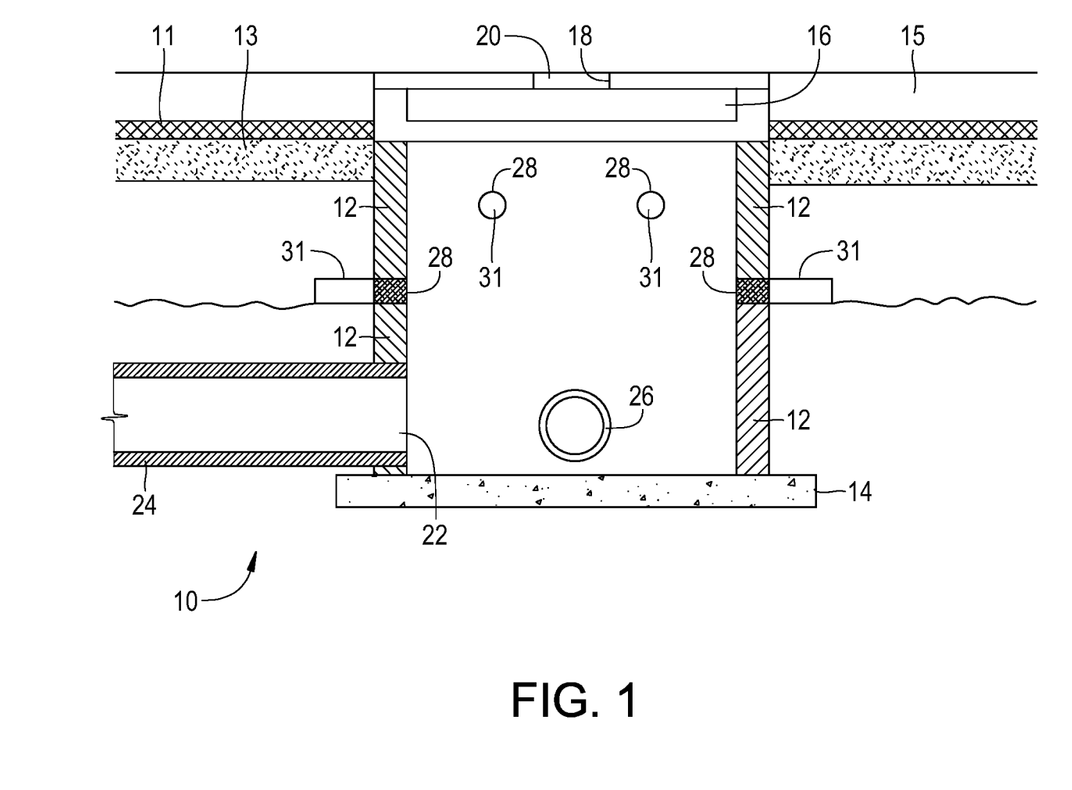
FIG. 1 is a sectional view of a catch basin side inlet in accordance with a first embodiment of the present invention.

Referring to FIG. 1, there is depicted a side inlet catch basin 10 in accordance with the first embodiment of the present invention. Catch basin 10 is located below grade and underneath a road having a street pavement layer 11 and a base course layer 13. Catch basin 10 includes a continuous sidewall 12, a concrete floor 14, a void defined by floor 14 and continuous sidewall 12, a throat 16 opening and extending through a curb 15 and an open top 18. A removable manhole cover 20 selectively covers open top 18 which, when removed, provides entry into catch basin 10. Throat 16 is arranged to receive stormwater that collects on the road and direct the stormwater into catch basin 10.

An outlet 22 extends through sidewall 12 immediately adjacent to floor 14 for directing water collected in catch basin 10 out of the catch basin through an outlet pipe 24. Catch basin 10 may also include an inlet pipe 26 for distributing water collected by other catch basins into catch basin 10 for removal from catch basin 10 through outlet pipe 24.

A plurality of inlets 28 extend through 12 sidewall above outlet 22. Inlets 28 are configured for receiving groundwater that has collected underneath the road and directing the groundwater into catch basin 10 for removal from catch basin through outlet pipe 24. A drain wick 31 is fluidly coupled to each inlet 28. Drain wicks 31 extend outward from catch basin 10 and are configured to collect and filter the groundwater and direct the filtered groundwater through inlets 28.

Figure 2:
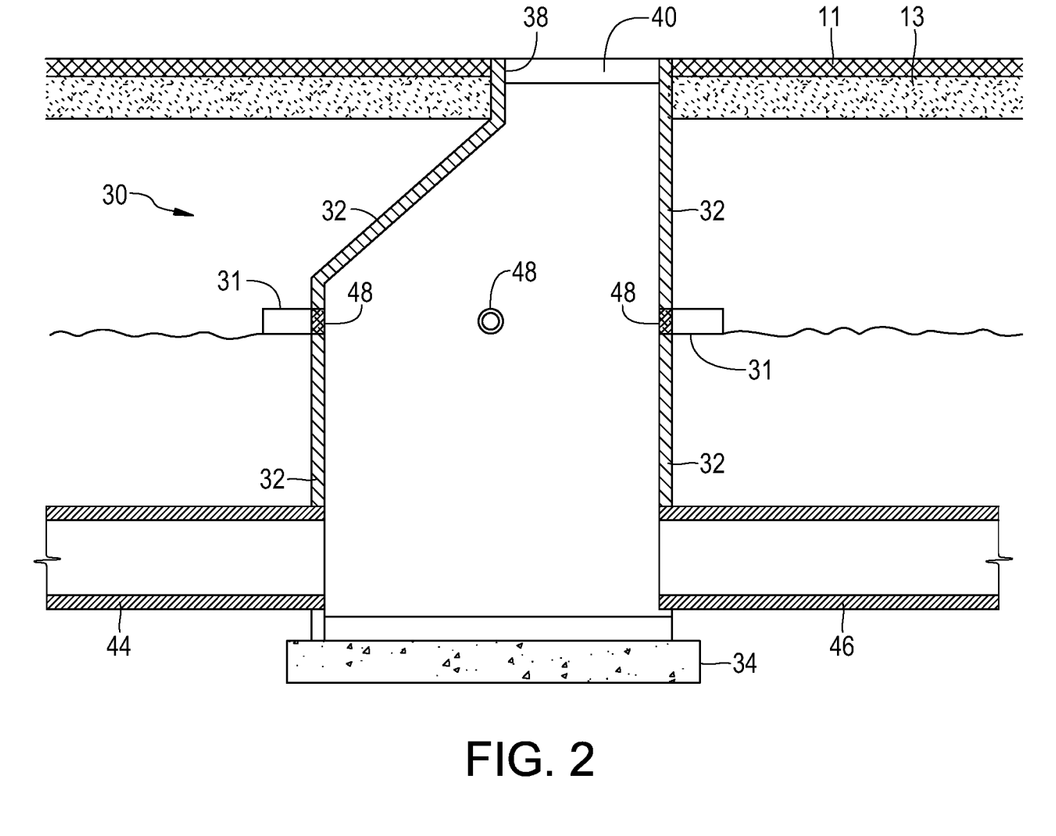
FIG. 2 is a sectional view of a drain manhole in accordance with the first embodiment of the present invention.
Figure 3:
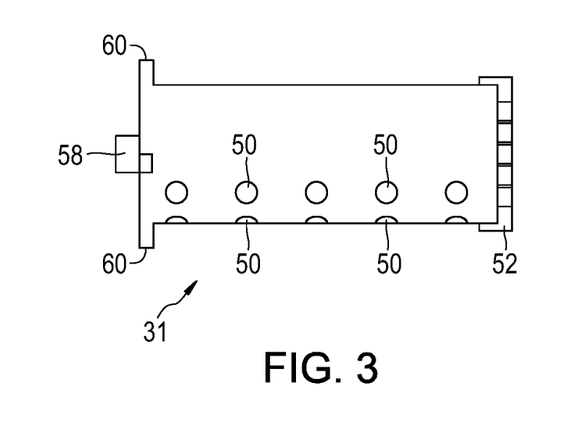
FIG. 3 is an elevational view of a side of a drain wick in accordance with the first embodiment of the present invention.
Figure 4:
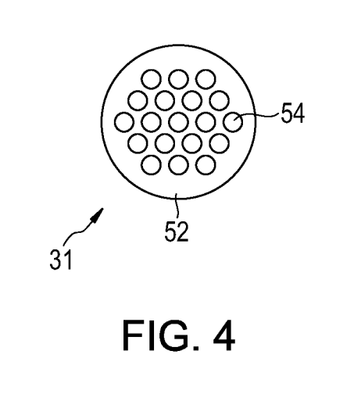
FIG. 4 is an elevation view of a first end of the drain wick of FIG. 3.
Figure 5:
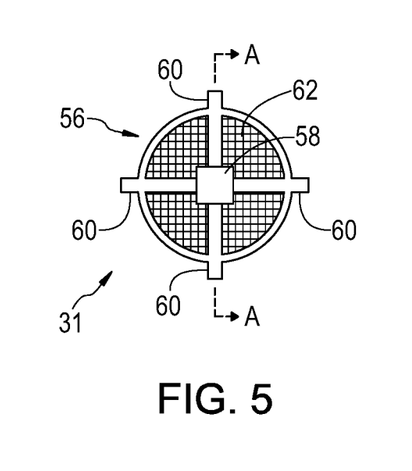
FIG. 5 is an elevation view of a second end of the drain wick of FIG. 3.
Figure 6:
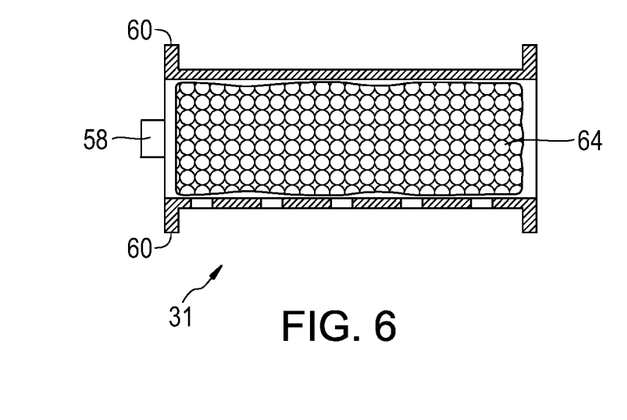
FIG. 6 is a sectional view of the drain wick of FIG. 5 along line A-A.

Referring to FIG. 2, there is depicted a drain manhole 30 in accordance with the first embodiment of the present invention. Drain manhole 30 is located below grade and underneath a road having a street pavement layer 11 and a base course layer 13. Drain manhole 30 includes a continuous sidewall 32, a concrete floor 34, a void defined by floor 34 and continuous sidewall 32 and an open top 38. A removable manhole cover 40 selectively covers open top 38 which, when removed, provides entry into drain manhole 30. Although a grated catch basin inlet is not illustrated in the drawings, it is understood that drain manhole 30 is convertible into a grated catch basin inlet by replacing manhole cover 40 with a grate having openings through which stormwater can enter into drain manhole 30.

An outlet 42 extends through sidewall 32 immediately adjacent to floor 34 for directing water collected and/or directed into manhole 30 out of the drain manhole through an outlet pipe 44. Drain manhole 30 also includes an inlet pipe 46 fluidly coupled thereto for distributing water collected by catch basins and the like for removal from drain manhole 30 through outlet pipe 44.

A plurality of inlets 48 extend through sidewall 32 above outlet 42. Inlets 48 are configured for receiving groundwater that has collected underneath the road and directing the groundwater into drain manhole 30 for removal from the drain manhole through outlet pipe 44. A drain wick 31 is fluidly coupled to each inlet 48. Drain wicks 31 extend outward from drain manhole 30 and are configured to collect and filter the groundwater and direct the filtered groundwater through inlets 48.

Referring to FIGS. 3 through 6 there is depicted drain wick 31 in accordance with the first embodiment of the present invention. Drain wick 31 is fabricated from a plastic or metal pipe having opposing male threaded end sections, a spring line and plurality of radial openings 50 extending there through at or below the spring line. A first end cap 52 having a plurality of holes 54 there through is removably coupled to one end of drain wick 31 via one of male threaded end sections. A locking member 56 is fixed to the other end of drain wick 31 vile the other male threaded end section. Locking member 56 includes a square locking nut 58 extending outwardly along a longitudinal axis of drain wick 31 and four locking tabs 60 that extend out from locking nut 58 and beyond a radius of drain wick 31. A wire mesh 62 extends within drain wick 31 immediately adjacent to locking member 56. Positioned inside of drain wick 31 between end cap 52 and wire mesh 62 is a filter cloth bag 64. Filter cloth bag 64 is fabricated from a geotextile material and contains a filter media. The filter media may include natural or man-made graded aggregate.

Figure 7:
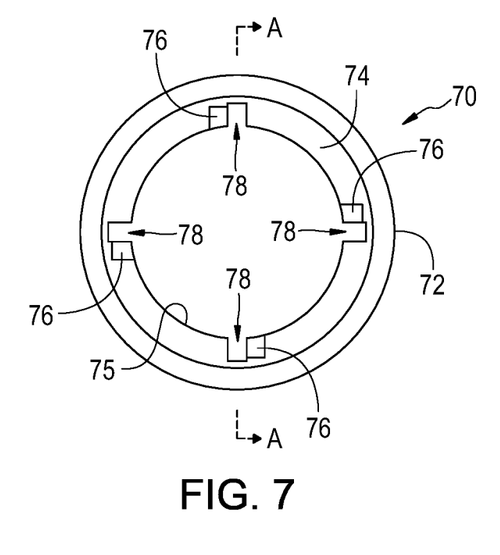
FIG. 7 is an elevational view of a locking ring in accordance with the first embodiment of the present invention.
Figure 8:
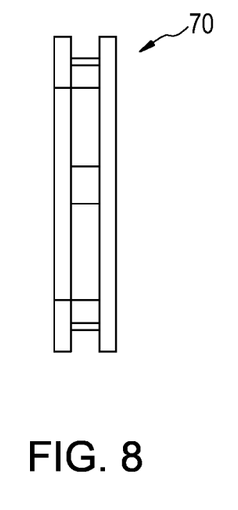
FIG. 8 is a sectional view of the locking ring of FIG. 7 along line B-B.

Referring to FIGS. 7 and 8, there is depicted a metal locking ring 70 in accordance with the first embodiment of the present invention. A locking ring 70 is fixed within each of inlets 28 of catch basin 10 and inlets 48 of drain manhole 30 to provide means by which drain wicks 31may be detachably and fluidly coupled to catch basin 10 and drain manhole 30. Each locking ring 70 includes an outer radial portion 72, an inner radial portion 74 and a central opening 75. Inner radial portion 74 includes four, inwardly tapered ramp portions 76 and a locking tab receiving slot 78 associated with each ramp portion 76. Locking rings 70 are arranged within the sidewalls with the inner radial portion 74 and ramp portion 76 facing inwardly towards the voids of catch basin 10 and drain manhole 30.

With locking rings 70 embedded in sidewalls 12, 32 of catch basin 10 and drain manhole 30, respectively, and about inlets 28, 48 (as depicted in FIGS. 1 and 2), drain wicks 31 may be detachably coupled thereto by inserting the drain wicks through inlets, 24, 48 so that extend outwardly from catch basin 10 and drain manhole 30, pressing locking tabs 60 of locking members 56 against inner radial portions 74 and rotating the drain wicks so that locking tabs 60 slide down ramp portion 76 into slots 78 and underneath inner radial portions 74. Arranged in this manner, locking tabs 60 and inner radial portions 74 interact to prevent axial separation between locking rings 70 and drain wicks 31. When a drain wick 31 becomes clogged or requires replacement of filter bag 64 or the filter media in the filter bag, a user may enter into catch basis 10 or drain manhole 30, use a tool to engage and rotate locking nut 58 and pull the drain wick through central opening 75. Removable end cap 52 can then be removed to gain access to filer bag 64.

Figure 9:
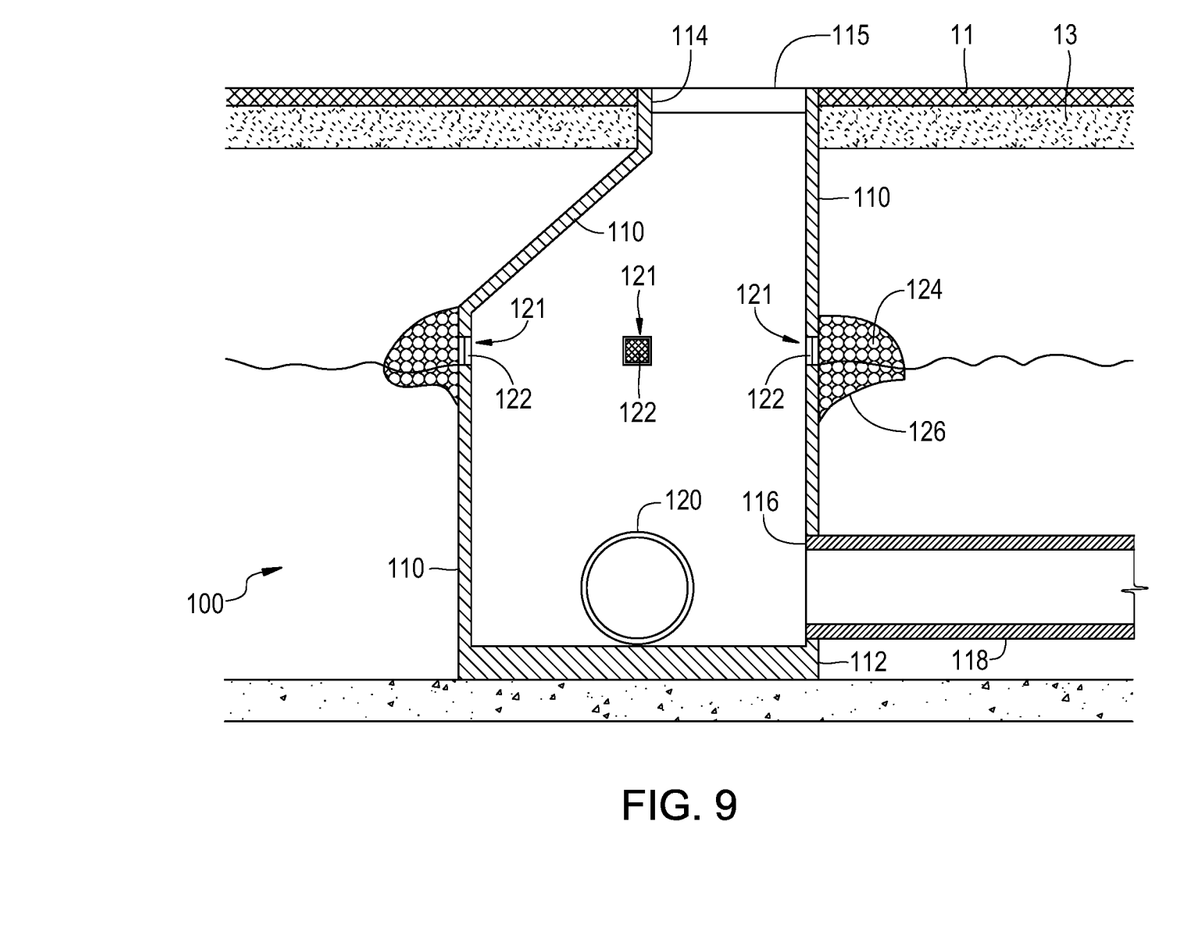
FIG. 9 is a sectional view of a first drain manhole in accordance with a second embodiment of the present invention.
Figure 10:
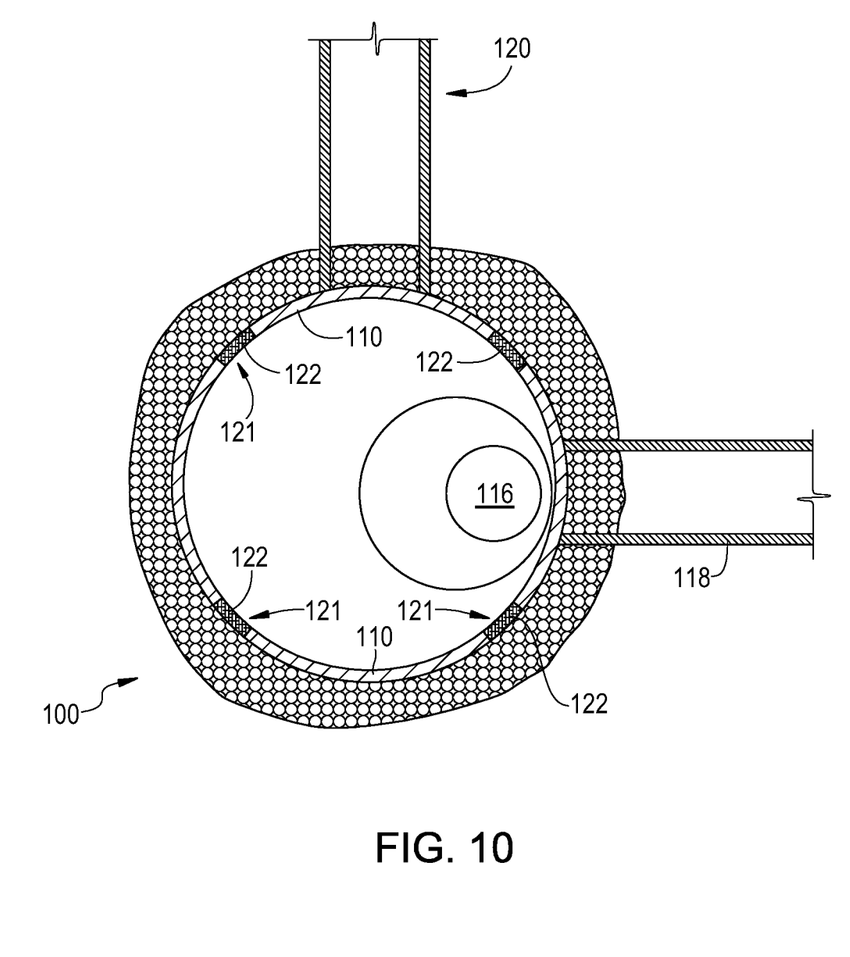
FIG. 10 is a sectional view of the first drain manhole of FIG. 9.

Referring to FIGS. 9 and 10, there is depicted a drain manhole 100 in accordance with a second embodiment of the present invention. Drain manhole 100 is located below grade and underneath a road having a street pavement layer 11 and a base course layer 13. Drain manhole 100 includes a continuous sidewall 110, a concrete floor 112, a void defined by floor 112 and continuous sidewall 110 and an open top 114. A removable manhole cover 116 selectively covers open top 114 which, when removed, provides entry into drain manhole 100.

An outlet 116 extends through sidewall 110 immediately adjacent to floor 112 for directing water collected and/or directed into manhole 100 out of the drain manhole through an outlet pipe 118. Drain manhole 100 also includes an inlet pipe 120 fluidly coupled thereto for distributing water collected by catch basins and the like for removal from drain manhole 100 through outlet pipe 118.

A plurality of inlets 121 extend through sidewall 110 above outlet 116. Inlets 121 are configured for receiving groundwater that has collected underneath the road and directing the groundwater into drain manhole 100 for removal from the drain manhole through outlet pipe 118. A drain grill assembly 122 is fixed within each inlet 121. Drain grill assemblies 122 are arranged to filter the groundwater and direct the filtered groundwater through inlets 121.

An amount of gravel 124 is disposed outside of drain manhole 100 and immediately adjacent to each drain grill assembly 122, the amount of gravel being sufficient to completely cover the drain grill assembly. A filter cloth 126 covers amount of gravel 124. Gravel 124 and filter cloth 126 serve to filter out large particle debris, while drain grill assembly 122 is configured for removing small particle debris.

Figure 11:
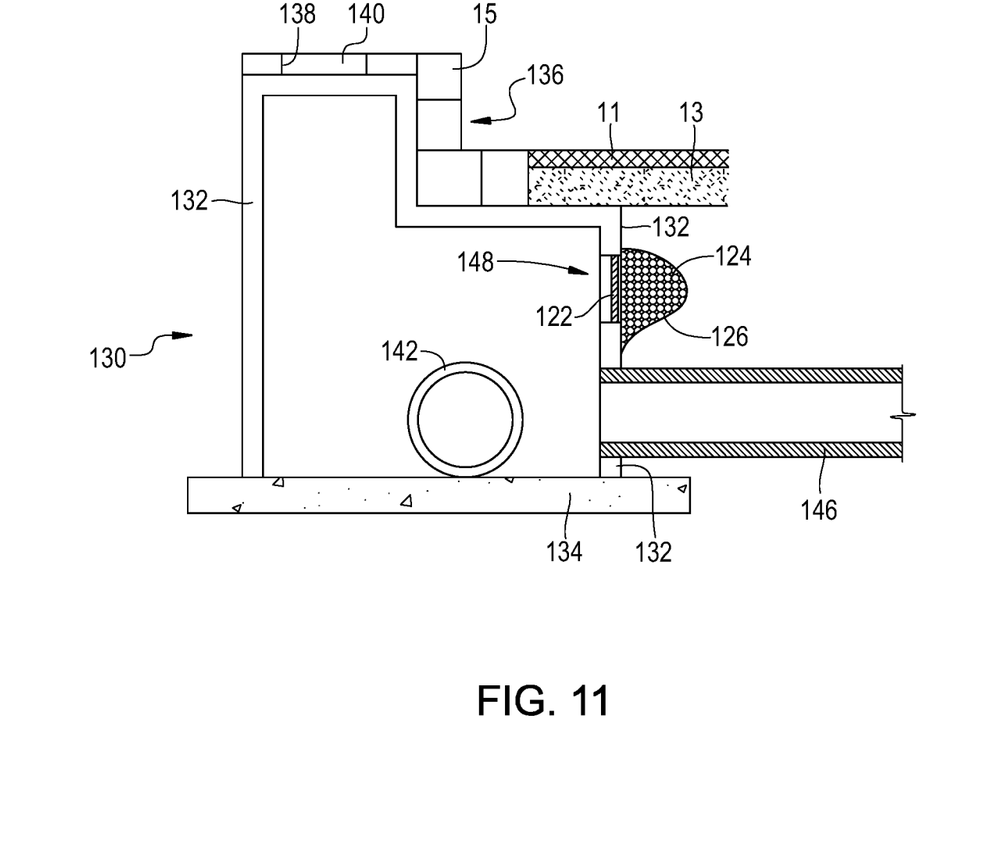
FIG. 11 is a sectional view of a catch basin side inlet in accordance with the second embodiment of the present invention.

Referring to FIG. 11, there is depicted a side inlet catch basin 130 in accordance with the first embodiment of the present invention. Catch basin 130 is located below grade and underneath a road having a street pavement layer 11 and a base course layer 13. Catch basin 130 includes a continuous sidewall 132, a concrete floor 134, a void defined by floor 134 and continuous sidewall 132, a throat 136 opening and extending through a curb 15 and an open top 138. A removable manhole cover 140 selectively covers open top 138 which, when removed, provides entry into catch basin 130. Throat 136 is arranged to receive stormwater that collects on the road and direct the stormwater into catch basin 130.

An outlet 142 extends through sidewall 132 immediately adjacent to floor 134 for directing water collected in catch basin 130 out of the catch basin through an outlet pipe. Catch basin 130 may also include an inlet pipe 146 for distributing water collected by other catch basins into catch basin 130 for removal from catch basin 130 through outlet 142.

A plurality of inlets 148 extend through 132 sidewall above outlet 142. Inlets 148 are configured for receiving groundwater that has collected underneath the road and directing the groundwater into catch basin 130 for removal from catch basin through outlet 142. A drain grill assembly 122 is fixed within each inlet 148. Drain grill assemblies 122 are arranged to filter the groundwater and direct the filtered groundwater through inlets 148.

An amount of gravel 124 is disposed outside of drain manhole 130 and immediately adjacent to each drain grill assembly 122, the amount of gravel being sufficient to completely cover the drain grill assembly. A filter cloth 126 covers amount of gravel 124.

Figure 12:
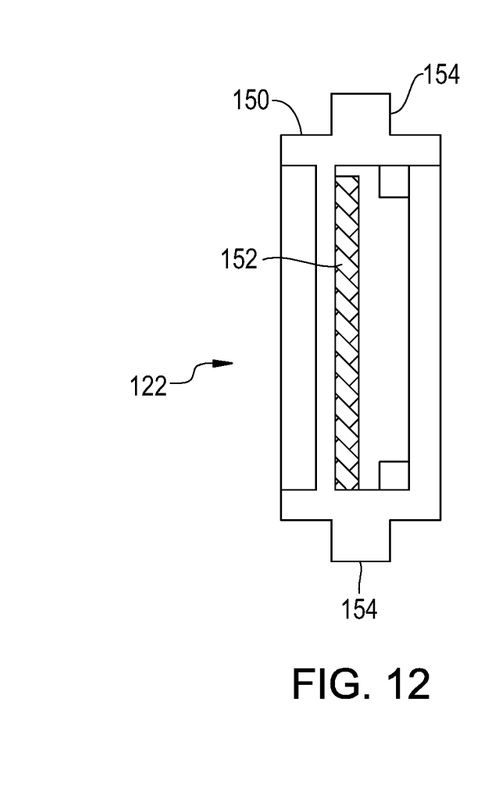
FIG. 12 is an elevational view of a side of a drain grill assembly in accordance with the second embodiment of the present invention.
Figure 13:
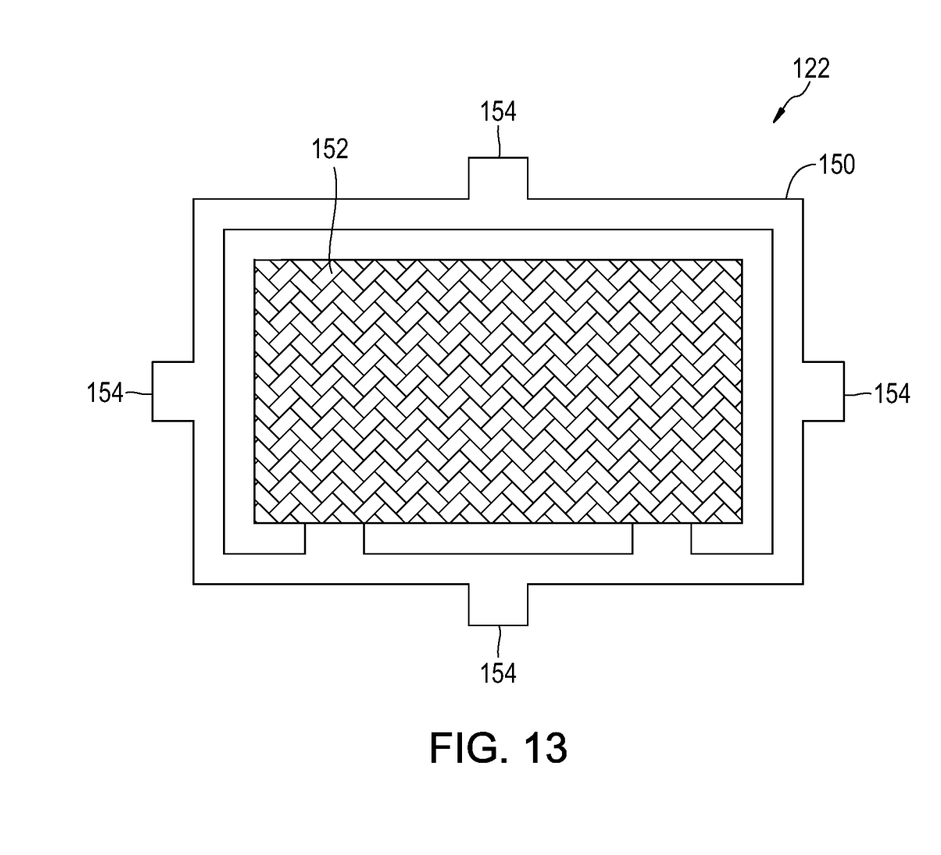
FIG. 13 is an elevational view of a face of the drain grill assembly of FIG. 12.

Referring to FIGS. 12 and 13, there is depicted a drain grill assembly 122 in accordance with the second embodiment of the present invention. Drain grill assembly 122 includes a substantially rectangular frame 150 supporting a rectangular grill 152. Frame 150 include. a number of anchor tabs 154 configured to be embedded within sidewall sidewalls 110, 132 of drain man hole 100 and catch basin 130, respectively, to rigidly seat drain grill assembly within inlets 120, 148.

Referring to FIG. 14, there is depicted drain manhole 30, as illustrated in FIG. 2, with multiple drain wicks coupled to a free end of one of drain wicks 31 to provide a drain wick stack 33. Drain wick stack 33 is formed by replacing end cap 52 of drain wick 31 with an end cap 53 having a first female threaded portion configured for attachment to drain wick 31 and a second female threaded portion for attachment to an adjacent drain wick. A screen or perforated wall extends across the opening defined by endcap 53 and between the first and second threaded portions. Additional drain wicks are attached to the stack by placing an end cap 53 between the free end of the stack and the additional drain wick and screwing the drain wicks together thereby fluidly coupling each drain wick in the stack to drain manhole 30. Referring to FIG. 15, there is depicted catch basin 10, as depicted in FIG. 1, with multiple drain wicks 33.

Figure 16:
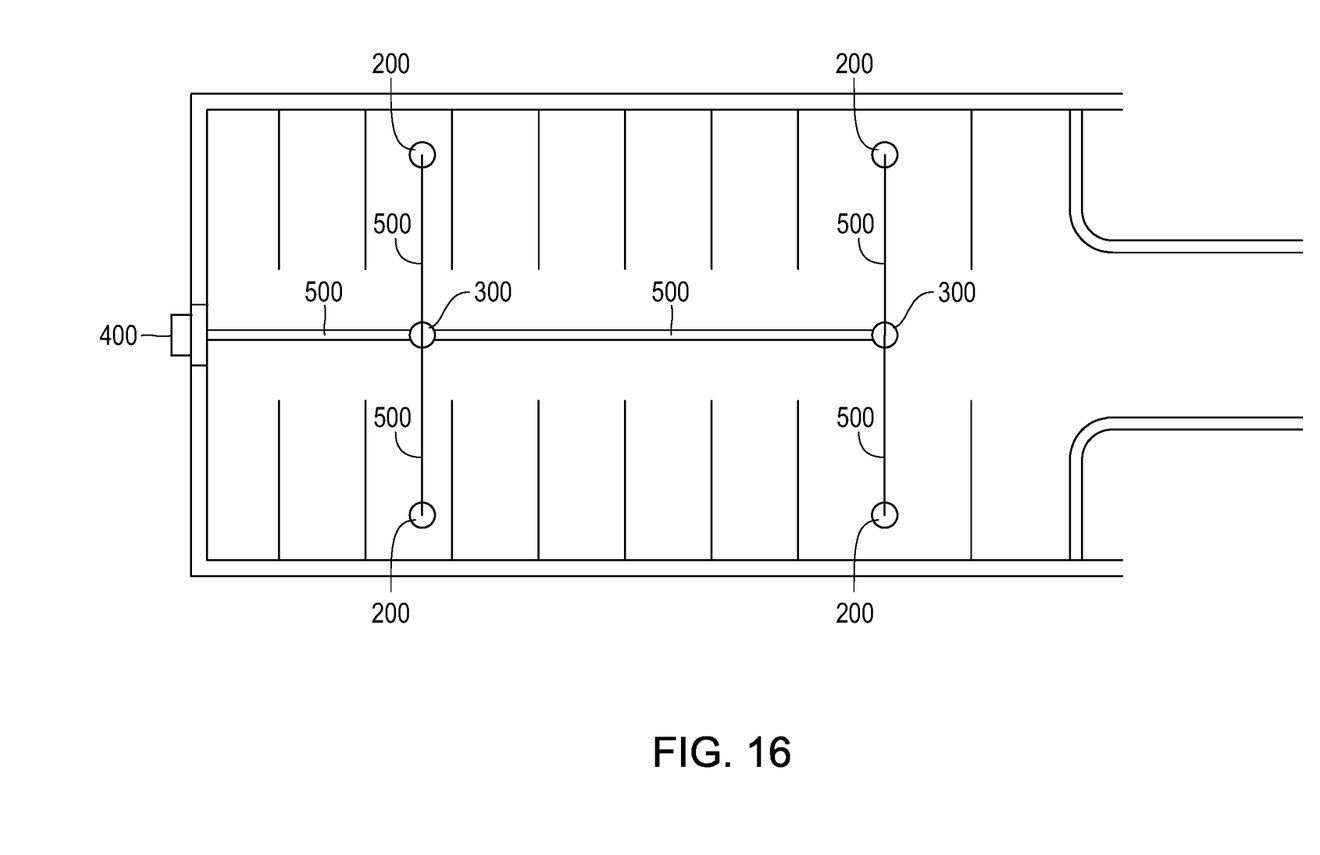
FIG. 16 is a schematic view of a parking lot water drainage system utilizing various components of the present invention.

Referring to FIG. 16, there is depicted a schematic view of a parking lot water drainage system utilizing various components of the present invention, as described above. The system includes grated inlet catch basins 200, drain manholes 300, a side inlet catch basin 400 and pipes 500 fluidly coupling catch basins 200, drain manholes 300, a side inlet catch basin 400.

As will be apparent to one skilled in the art, various modifications can be made within the scope of the aforesaid description. Such modifications being within the ability of one skilled in the art form a part of the present invention and are embraced by the claims below.

What is claimed:

1. A drainage system comprising:
a surface selected from the group consisting of a parking lot, a road, a patio, a driveway, a sidewalk, a stone slab, a concrete slab, a water impervious slab and an asphalt slab,
a first housing located below grade, the first housing including a continuous sidewall, a floor, a void defined by the floor and the continuous sidewall, an open top extending to or through the surface through which stormwater collecting on the surface may enter into the void, an outlet extending through the sidewall immediately adjacent to the floor, and a plurality of inlets through the sidewall located above the outlet, wherein the housing is selected from the group consisting of a drain manhole, a catch basin side inlet, and a catch basin grated inlet,
a locking ring fixed within each inlet of the plurality of inlets, and
a drain wick fluidly coupled to each inlet and configured for collecting groundwater underneath the surface and directing the ground water through the inlet and into the void, the drain wick extending radially outward from the housing,
wherein the drain wick includes a pipe having a spring line and plurality of radial openings extending there through at or below the spring line, a first end cap having a plurality of holes there through, an opposing second end including a locking nut configured for detachably coupling the second end of the drain wick to the locking ring, a wire screen in the second end, a filter cloth bag located between the wire screen and the first end cap, and a filter media in the cloth bag.

2. The system of claim 1 including a pipe fluidly coupled between the outlet of the first housing and a second housing, wherein the second housing is selected from the group consisting of a second drain manhole, a second catch basin side inlet, and a second catch basin grated inlet.

3. The system of claim 2 including a drain wick stack operatively coupled to the first housing and the second housing.

4. A drainage system comprising:
a surface selected from the group consisting of a parking lot, a road, a patio, a driveway, a sidewalk, a stone slab, a concrete slab, a water impervious slab and an asphalt slab,
a first housing located below grade, the first housing including a continuous sidewall, a floor, a void defined by the floor and the continuous sidewall, an open top extending to or through the surface through which stormwater collecting on the surface may enter into the void, an outlet extending through the sidewall immediately adjacent to the floor, and a plurality of inlets through the sidewall located above the outlet, wherein the housing is selected from the group consisting of a drain manhole, a catch basin side inlet, and a catch basin grated inlet,
a drain grill assembly removably fixed within each inlet and configured for allowing the ground water to pass through the inlet and into the void, the drain grill assembly including a substantially rectangular frame supporting a rectangular grill,
an amount of gravel disposed outside of the housing and immediately adjacent to each drain grill assembly, the amount of gravel being sufficient to completely cover the drain grill assembly, and
a filter cloth covering the amount of gravel.

5. The system of claim 4 including a pipe fluidly coupled between the outlet of the first housing and a second housing, wherein the second housing is selected from the group consisting of a second drain manhole, a second catch basin side inlet, and a second catch basin grated inlet.

6. The system of claim 4 including a drain wick stack coupled to the first housing and the cd housing.

* * * * *